United States Patent
Wu et al.

(10) Patent No.: US 11,090,703 B2
(45) Date of Patent: Aug. 17, 2021

(54) SOIL RESTORATION METHOD AND STRUCTURE

(71) Applicants: CORIGIN INTERNATIONAL INSTITUTE, Taipei (TW); Ervin Hen Tsay, Taipei (TW)

(72) Inventors: Yu Tung Wu, Taipei (TW); Ervin Hen Tsay, Taipei (TW)

(73) Assignees: Corigin International Institute, Taipei (TW); Ervin Hen Tsay, Taipei (TW)

( * ) Notice: Subject to any disclaimer, the term of this patent is extended or adjusted under 35 U.S.C. 154(b) by 0 days.

(21) Appl. No.: 16/794,665

(22) Filed: Feb. 19, 2020

(65) Prior Publication Data

US 2020/0179998 A1 Jun. 11, 2020

Related U.S. Application Data

(63) Continuation-in-part of application No. 15/242,212, filed on Aug. 19, 2016, now abandoned.

(51) Int. Cl.
*B09C 1/08* (2006.01)

(52) U.S. Cl.
CPC ..................... *B09C 1/08* (2013.01)

(58) Field of Classification Search
CPC ........ A01G 22/00; C05B 17/00; C05B 19/00; C05D 1/00; C05D 1/005; C05D 3/00; C05D 5/00; C05D 9/02; C05G 3/00; C05G 3/0058; C09K 17/04; C09K 17/06; C09K 17/08
See application file for complete search history.

(56) References Cited

U.S. PATENT DOCUMENTS

| | | | |
|---|---|---|---|
| 4,297,122 A | 10/1981 | Wallace | |
| 6,030,704 A | 2/2000 | Wilshaw | |
| 6,293,047 B1 | 9/2001 | Acey | |
| 6,303,367 B1 | 10/2001 | Kataoka | |
| 6,544,426 B2 | 4/2003 | Mori | |
| 8,308,838 B2 * | 11/2012 | Daniels | C05F 5/002 71/22 |
| 8,790,436 B2 * | 7/2014 | Ersek | C05F 17/10 71/6 |

(Continued)

*Primary Examiner* — Benjamin F Fiorello
(74) *Attorney, Agent, or Firm* — Muncy, Geissler, Olds & Lowe, P.C.

(57) ABSTRACT

The present invention mainly applies the characteristics of mineral element with the added integration of effective micro organisms, porous minerals, an organic plant protection liquid, and organic materials to achieve a technique that provides soil restoration effectiveness. When being applied in manufacturing a soil restoration product, which facilitates warehousing reserves, and delivery. Accordingly, for pesticide or chemical fertilizer polluted low-nutrient soil or heavy metal polluted soil, reciprocal antagonistic effects between elements is capable of changing the electrovalence of the elements, further controlling the development function of the elements. Hence, even if heavy metal elements harmful to the human body are present in the soil, plants will not absorb them during the process of plant growth. The antagonistic effects paired with synergistic effects between mineral elements that enables effective adjustment of soil to bring about soil restoration, strengthening plant nutrient absorption, improving crop quality, and increasing output.

20 Claims, 7 Drawing Sheets

(56) References Cited

U.S. PATENT DOCUMENTS

| | | | |
|---|---|---|---|
| 9,661,857 B2 * | 5/2017 | Yamashita | A01N 41/04 |
| 10,508,060 B1 * | 12/2019 | Roach | C05B 11/10 |
| 2005/0051327 A1 | 3/2005 | Vinegar | |
| 2006/0247364 A1 | 11/2006 | Murray | |
| 2009/0078014 A1 | 3/2009 | Yamashita | |
| 2013/0236952 A1 | 9/2013 | Hazewinkel | |
| 2015/0239788 A1 | 8/2015 | Yamashita | |
| 2017/0362109 A1 | 12/2017 | Taguchi | |

* cited by examiner

SOIL RESTORATION METHOD AND STRUCTURE

RELATED APPLICATION

This application is a Continuation-in-Part of U.S. patent application Ser. No. 15/242,212 filed on Aug. 19, 2016.

BACKGROUND OF THE INVENTION

(a) Field of the Invention

The present invention relates to a soil restoration method and structure, and more particularly to applying antagonistic and synergistic effects between mineral element to soil polluted with heavy metals, pesticides, or chemical fertilizers so that plants will not absorb heavy metal elements harmful to the human body present in the soil during the process of plant growth. In addition, the present invention enables adjustment and restoration of soil to strengthen crop nutrient absorption, improve quality, and increase output.

(b) Description of the Prior Art

Traditional agricultural soil has undergone thousands of years of plowing and sowing, with the nutrients farmed therefrom being assimilated by generations of people. Hence, the soil passed down to the present is already in a poor nutritional state, and even contains contaminating poisons. The principal cause stems from farmers never replenishing mineral elements when growing crops, and the chemical fertilizers, pesticides, and weed killers used for cultivating the crops, or contamination resulting from industrial activities result in harmful heavy metal residual in the soil and excessive amounts of nitrates. Hence, when humans consume agricultural produce containing high amounts of nitrates, after entering the human body, the nitrates are converted into nitrites, which become carcinogenic agents over a long period of consumption. And due to the large use of pesticides and chemical fertilizers, toxic substances such as nitrites, heavy metals, etc., entering the food chain are already endangering human health. Thus, fodder safety, safety of livestock products, and animal epidemic disease control have become important issues.

In order to increase output effectiveness, there exists the widespread practice of over planting and the use of large amounts of chemicals on present-day farmland, which has resulted in depletion of farmland topsoil, soil hardening, biological degradation of soil, acidification, salinization, continuous decrease in basic soil fertility, extremely serious contamination problems, and increase in heavy metal contamination. The large use of pesticides and chemical fertilizers results in a decrease in the organic content of soil and soil hardening, which leads to a decrease in agricultural produce output and quality. In addition, mining, industrial pollution discharge, and dumping similarly result in serious heavy metal contamination, wherein the five heavy metals mercury, cadmium, lead, chromium, and arsenic are known as the heavy metal "five poisons", and constitute fatal hazards to the human body. These contaminants seriously affect child development, and are known to be disease producing and carcinogenic to humans, and thus seriously endangering people's lives and health.

In particular, under the pressure to increase production, the misuse of chemical fertilizers on farmland by developing nations is extremely serious. According to statistical data, only 35% of chemical fertilizers applied to farmland is absorbed by the crops, with the remaining 65% being discharged in the form of pollutants, seriously polluting the farmland. Moreover, waste water containing nitrogenous fertilizer pollutes water supplies, leading to soil acidification and falling crop yields. Furthermore, only about 0.1% of the large quantities of pesticides used have an effect on the target insects, with 99.9% of the pesticides entering the ecosystem, which results in heavy metal pollution of large quantities of soil. And the escalation of pollution has resulted in a significant decrease in the effective micro organism species in the soil, thus, the soil pollution conditions is such that it has already exceeded the self-purification capacity of the soil, and without outside intervention, there is the fear that the self-purification of the soil will not be achieved even after thousands of years. Hence, crops grown on the polluted farmlands are already seriously endangering human health.

At present, the traditional way to deal with polluted or low-nutrient soil is to adopt measures such as soil discharging, turning over soil, and soil replacement to slow down output. Academic organizations are also conducting research on the effect relationship between mineral elements and balancing soil pH, and the application of organic matter to vitalize the soil constitution, however, so far there has only been snippets of research and application. And a systematic soil restoration method that solves the above-described problems has not yet been developed.

In light of this, the inventor of the present invention, having accumulated years of research and practical experience in related fields, has specially invented a soil restoration method and a structure. And in order to improve the above-described shortcomings of the prior art, research carried out by the inventor of the present invention discovered that the periphery of each mineral element has ions, and when the ions come into contact with energy, such as heat, extreme acidity, or extreme alkalinity, antagonistic effects of the mineral elements cause the external ions to jump off, thereby changing the electron valence of the elements. Because soil particles concurrently carry both positive charges and negative charges, thus, when an increase in the soil pH value induces the dissociation of positively charged protons (releasing H+) from the acidic plant roots causes the roots to become negatively charged, which contributes to the absorption of other positive ions. On the contrary, when the soil pH value decreases, $NH_2(-)$ attracts protons, and the roots become positively charged, which contributes to the absorption of other negative ions. Accordingly, using the antagonistic and synergistic effects between molecules enables producing absorption and permeation effects.

The inventor of the present invention, through many years of experiments, has applied research results to farming practices under conditions in which soil contains heavy metal elements, and reciprocal antagonistic effects between elements has enabled changing the electrovalence of the elements, which has further controlled the development function of the elements. Therefore, plants will not absorb any heavy metal elements harmful to the human body that might be present in the soil during plant growth. Hence, the antagonistic effects in cooperation with synergistic effects between the mineral elements enable producing multiplicative effects which effectively remedy the soil structure to achieve soil restoration, and further strengthens crop nutrition, improves quality, and increases output, thereby achieving the object of sustainable use of agricultural land.

The present invention applied distinctive research and technology using trace amounts of 26 kinds of natural active mineral elements as the formulation basis, including: iron (Fe), nickel (Ni), manganese (Mn), copper (Cu), zinc (zinc), molybdenum (Mo), chlorine (Cl), oxygen (O), sodium (Na), magnesium (Mg), aluminum (Al), silicon (Si), phosphorus (P), sulfur (S), potassium (K), calcium (Ca), scandium (Sc), titanium (Ti), chromium (Cr), vanadium (V), gallium (Ga), selenium (Se), germanium (Ge), lanthanum (La), samarium (Sm), and cobalt (Co); which completely comprise all the nutrient elements necessary for the growth of 16 kinds of plants. Such a wide variety of mineral elements maintain the interaction between catalysts and enzymes, enabling the supply of nutrients to plant roots and maintaining normal growth of plants. Moreover, the soil is strengthened with active amino acids, and nitrogen-containing microorganisms enter along oxygen channels and reside within the open cellular elements, where they begin to grow and multiply, thereby enabling the retention of moisture content and nutrients, leading to more fertile farmland.

SUMMARY OF THE INVENTION

In order to achieve the aforementioned objects, the present invention is primarily aimed at a soil restoration method and structure developed for application in heavy metal polluted and pesticide or chemical fertilizer polluted low-nutrient soil, and, more particularly, is related to systematization of the soil restoration method, which applies the effectiveness provided by the characteristics of mineral elements and other methods in addition to adding a mixture of effective micro organisms, porous mineral fragments, an organic plant protection liquid, organic fertilizer, fiber, and humic acid, combined together to form a technique with soil restoration effectiveness, as well as providing the technology to compose a structure that achieves the same effect when applied to polluted soil.

Based on the above-described technological characteristics, the soil restoration method of the present invention applied to heavy metal polluted soil comprises the following steps:

First step: Testing soil condition and determining whether heavy metal pollutants are present.

Second step: Testing the heavy metal elements that have polluted the soil and collecting related data.

Third step: When the heavy metal pollutants include at least one of the elements: mercury, cadmium, arsenic, and lead; based on the conditions and data of the first step and the second step, decide which mineral elements to add to the polluted soil that provide the required antagonistic effects, including at least more than two of the elements: selenium (Se), molybdenum (Mo), germanium (Ge), zinc (Zn), sulphur (S), copper (Cu), and calcium (Ca); and at the same time add to the polluted soil mineral elements that provide the required synergistic effects, including at least more than one of the elements manganese (Mn), calcium (Ca), copper (Cu), magnesium Mg), molybdenum (Mo), zinc (Zn), nitrogen (N), boron (B), phosphorus (P), iron (Fe), and potassium (K).

Fourth step: Based on the conditions and data of the first step and the second step, decide which photosynthetic organisms among effective micro organisms to add, together with at least more than one lactic acid organism, yeast organism, actino-organism, and fermentative filamentous flora; wherein the proportion of photosynthetic organisms of the effective micro organisms account for 10 to 20%, lactic acid organisms account for 20 to 30%, yeast organisms account for 20 to 30%, actino-organisms account for 10 to 20%, and fermentative filamentous flora account for 10 to 20%. And Fifth step: Based on the conditions and data of the first step and the second step, decide to add porous mineral fragments and the organic plant protection liquid. Proportions added are 10% to 20% of the effective micro organisms, 40% to 60% of the porous mineral fragments, and 30% to 40% of the organic plant protection liquid. The porous mineral fragments are composed of silicon oxide and aluminum oxide, and further comprise either diatomaceous earth (infusorial earth) or zeolite. After micronization through a breaking process, the size of each porous mineral fragment is approximately 50 to 70 mesh. The porosity characteristic of the structure of the porous mineral fragments and good absorption capacity are used to achieve absorbing minerals, microorganisms, and the organic fertilizer, enabling slow and controlled release in the soil.

Based on the above-described technological characteristics, application of the restoration method using antagonistic effects between mineral elements can effectively prevent plants from absorbing heavy metal elements present in the soil harmful to the human body during the process of plant growth. Hence, farm crops grown in such soil will also not contain heavy metal elements harmful to the human body. Moreover, the restoration method enables effective remedying and structural restoration of soil, and further strengthens farm crop nutrition as well as quality thereof in addition to increasing output, thereby enabling achieving the object of sustainable use of agricultural land.

Based on the above-described technological characteristics, the restoration method of the present invention applied to a low-nutrient soil polluted with pesticides or chemical fertilizers comprises the following steps:

First step: Testing whether or not the soil is low-nutrient soil, pH value of the soil, water content, and collecting data.

Second step: Testing and collecting data of the condition of cultures and microorganisms in the soil.

Third step: Testing and collecting data of the condition of minerals in the soil.

Fourth step: Based on the conditions and data of the first step, second step, and third step, decide to add at least one of the following: the organic fertilizer, the fiber, the humic acid, and peat soil/turf soil; accordingly making a neutralization adjustment of the pH value of the soil.

Fifth step: Based on the conditions and data of the first step, second step, and third step, decide to add into the soil at least more than two types of the following mineral elements required to achieve synergistic effects: manganese (Mn), calcium (Ca), copper (Cu), magnesium (Mg), molybdenum (Mo), zinc (Zn), nitrogen (N), boron (B), phosphorus (P), iron (Fe), and potassium (K).

Sixth step: Based on the conditions and data of the first step, second step, and third step, decide to add photosynthetic organisms among the effective micro organisms, and at least more than one type of lactic acid organism, yeast organism, actino-organism, and fermentative filamentous flora.

Seventh step: Based on the conditions and data of the first step, second step, and third step, decide to further add the porous mineral fragments and the organic plant protection liquid; wherein the effective micro organisms account for 10% to 20% of the total amount added, the porous mineral fragments account for 40% to 60% of total amount added, and the organic plant protection liquid accounts for 30% to 40% of the total amount added. And Eighth step: Based on the conditions and data of the first step, second step, and third step, for every ⅙ an acre of soil, decide to use 120~200 kg of the liquid organic fertilizer with the addition of 10~20 kg of a mixture of mineral elements comprising manganese (Mn), calcium (Ca), copper (Cu), magnesium Mg), molybdenum (Mo), zinc (Zn), nitrogen (N), boron (B), phosphorus (P), iron (Fe), and potassium (K). After placing into the soil and turning the soil over, for every ⅙ an acre of soil, allow 1 kg of the effective micro organisms diluted 800~1000 times with water to flow into the soil every 3~4 weeks to enable absorption by the plant roots. In total using 3~4 kg of the effective micro organisms in 3~4 separate applications.

Based on the above-described technological characteristics, the present invention can be further applied in product manufacturing formulation, whereby a soil restoration structure is produced, wherein the structure enables the use of a storage method for storing a reserve thereof, thereby achieving the object of widespread application in low-nutrient soil polluted with pesticides or chemical fertilizers. The soil restoration structure of the present invention comprises:

A plurality of the porous mineral fragments, wherein the dimensions of each porous mineral fragment is approximately 50 to 70 mesh. The porous mineral fragments have water absorption properties (hygroscopicity) and assume irregular broken shapes, with the structural annular surfaces of the fragment pieces provided with different sized internal holes and channel structures.

More than two mineral elements to produce the required synergistic effects from among the elements: iron, nickel, manganese, copper, zinc, boron, molybdenum, sodium, magnesium, aluminium, silicon, phosphorus, sulphur, potassium, calcium, scandium, titanium, chromium, vanadium, gallium, selenium, germanium, lanthanum, samarium, cobalt, iodine, and tin. The plurality of porous mineral fragments are formed by micronization of a porous mineral main body using a breaking process.

Photosynthetic organisms from among the effective micro organisms, and at least more than one lactic acid organism, yeast organism, actino-organism, and fermentative filamentous flora.

A composite layer, which is formed from a mixture of the fiber, the organic fertilizer, and organic plant protection liquid and used to cover the porous mineral fragments after being made up from a mixture of the above-described mineral elements, the effective micro organisms, the fiber, the organic fertilizer, and the organic plant protection liquid, thereby achieving the effect to make it difficult for the minerals, microorganisms, and the organic fertilizer to run off, as well as enabling controlled release of the above-described components in the soil so as to benefit the restoration application thereof. And An adhesion layer, which is formed from an excipient made from starch material blended with water that is intermixed with a plurality of the above-described porous mineral fragments to enable producing synergistic effects between the mineral elements, the effective micro organisms, and the composite layer. The adhesion layer is used to adhere and combine the above-described components to facilitate storage and application of the structures.

Based on the above-described technological characteristics, the manufacturing process of the soil restoration structures of the present invention comprises the following steps:

First step: Mixing the porous mineral fragments with the fiber, the organic fertilizer, and the organic plant protection liquid.

Second step: Mixing with at least more than two of the following mineral elements to produce the required synergistic effects: iron, nickel, manganese, copper, zinc, boron, molybdenum, sodium, magnesium, aluminium, silicon, phosphorus, sulphur, potassium, calcium, scandium, titanium, chromium, vanadium, gallium, selenium, germanium, lanthanum, samarium, cobalt, iodine, and tin.

Third step: Mixing with photosynthetic organisms from among the effective micro organisms and at least more than one lactic acid organism, yeast organism, actino-organism, and fermentative filamentous flora.

Fourth step: Adding a hydrating excipient to form chunks or strips. And

Fifth step: Cutting the formed chunks or strips to form small pieces or crumble to form granules.

Based on the above-described technological characteristics, when the above-described soil restoration structures are applied to heavy metal polluted soil, based on tests to determine which heavy metal elements are polluting the soil and related data, more than two of the following mineral elements must be further added to produce the required antagonistic effects; selenium (Se), molybdenum (Mo), germanium (Ge), zinc (Zn), sulphur (S), copper (Cu), and calcium (Ca).

Based on the above-described technological characteristics, regardless of whether the restoration method of the present invention is applied to heavy metal polluted soil, or pesticide or chemical fertilizer polluted low-nutrient soil, or the restoration structures are applied to the soil and manufacturing process thereof, all require further addition of the effective micro organisms to improve restoration of the soil. The effective micro organisms comprise photosynthetic organisms and at least more than one lactic acid organism, yeast organism, actino-organism, and fermentative filamentous flora, wherein the photosynthetic organisms primarily use light energy, and use carbon dioxide or organic effects as the carbon source for plant growth and development. If the number of photosynthetic organisms in the soil increases, then the quantity of other effective micro organisms will also increase. Hence, photosynthetic organisms are the main organisms among the effective micro organisms, and play the role of producing mutual effects with the lactic acid organisms, yeast organisms, actino-organisms, and the fermentative filamentous flora.

Based on the above-described technological characteristics, when the restoration method of the present invention is applied in heavy metal polluted soil, or pesticide or chemical fertilizer polluted low-nutrient soil, or the restoration structures are applied in the soil and manufacturing process thereof, the proportion of each organism group of the effective micro organisms is respectively 10 to 20% of photosynthetic organisms, 20 to 30% of lactic acid organisms, 20 to 30% of yeast organisms, 10 to 20% of actino-organisms and 10 to 20% of fermentative filamentous flora. The organic fertilizer comprises materials/compounds including at least one of compost, lime, oyster shell powder, calcium superphosphate, ferric oxide, zinc oxide, manganese oxide, calcium hydrophosphate, and calcium carbonate. The fiber comprises agricultural and animal husbandry waste material, including rice straw, wheat straw, root stalks, and leaves or weeds.

Based on the above-described technological characteristics, the porous mineral main body is composed of silicon oxide and aluminum oxide, comprising either diatomaceous earth (infusorial earth) or zeolite. And after micronization of the the porous mineral main body using a breaking process, the dimensions of the porous mineral fragments are approximately 50 to 70 mesh. The porous structural annular surface of each of the porous mineral fragments is formed with different sized internal holes and channels. After undergoing heating and dehydration processing, moisture absorbed in the porous mineral fragments is removed; the temperature is then allowed to fall, when the liquid organic fertilizer with molecules of appropriate size is added, which is absorbed by the porous mineral fragments, making it difficult for the liquid organic fertilizer component to run off, and application in the soil enables a continued supply of the appropriate amount of nutrients required for farm crops.

Based on the above-described technological characteristics, the main components of the organic plant protection liquid comprise at least one of the compounds including matrine ($C_{15}H_{24}ON_2$), oxymatrine ($C_{16}H_{24}O_2H_2$), prolactin ($C_{11}H_6O_6$). In addition, total content of the main components is 0.6%, specific weight is 0.98 to 1.02 (20 degrees C./4 degrees C.) of aqueous solution; and secondary components of the organic plant protection liquid comprise at least one of the fluids including sophora alkali fluid, arborvitae fluid (*Platycladus orientalis*), delphinium grandiflorum fluid, populus alba decoction fluid, cogon grass decoction fluid (*Imperata cylindrical*), belladonna solution, red chilli fluid, and fennel fluid. Moreover, total content of the secondary components is 0.3%, and specific weight is 0.98 to 1.02 (20 degrees C./4 degrees C.) of aqueous solution. Using the porous mineral fragments that have been micronized by cutting and breaking into pieces enables the elimination of insect bodies that come into contact therewith through the physiological damaging effects of dissection; while at the same time using the natural physio and chemical characteristics of Chinese medical herbs and plants contained in the organic plant protection liquid enable improving safety and increasing the effectiveness of disinsection.

Based on the above-described technological characteristics, the photosynthetic organisms contained in the effective micro organisms, the lactic acid organisms, yeast organisms, actino-organisms, and the fermentative filamentous flora have a mutual effect relationship. The antagonistic effects and synergistic effects between mineral elements are also able to produce complimentary effectiveness, which supplements the organic plant protection liquid. Furthermore, the disinsection effectiveness through the physiological damaging effects of dissection and control effect of the micronized porous mineral fragments enable restoring soil fertility of the farmland, providing the soil with a rich content of a plurality of minerals and micronutrients, and enabling the farm crops produced to have a rich content of minerals and micronutrients required by the human body, as well as enabling effective remedying and structural restoration of the soil. Furthermore, farm crop nutrition and quality is strengthened, and output is increased, which enables achieving the object of sustainable use of agricultural land.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

In order to enable the review committee to have a better understanding and knowledge of the content of the present invention and effectiveness achieved, the following in conjunction with the drawings provides a detailed description of the embodiments disclosed herein.

Figure 1:
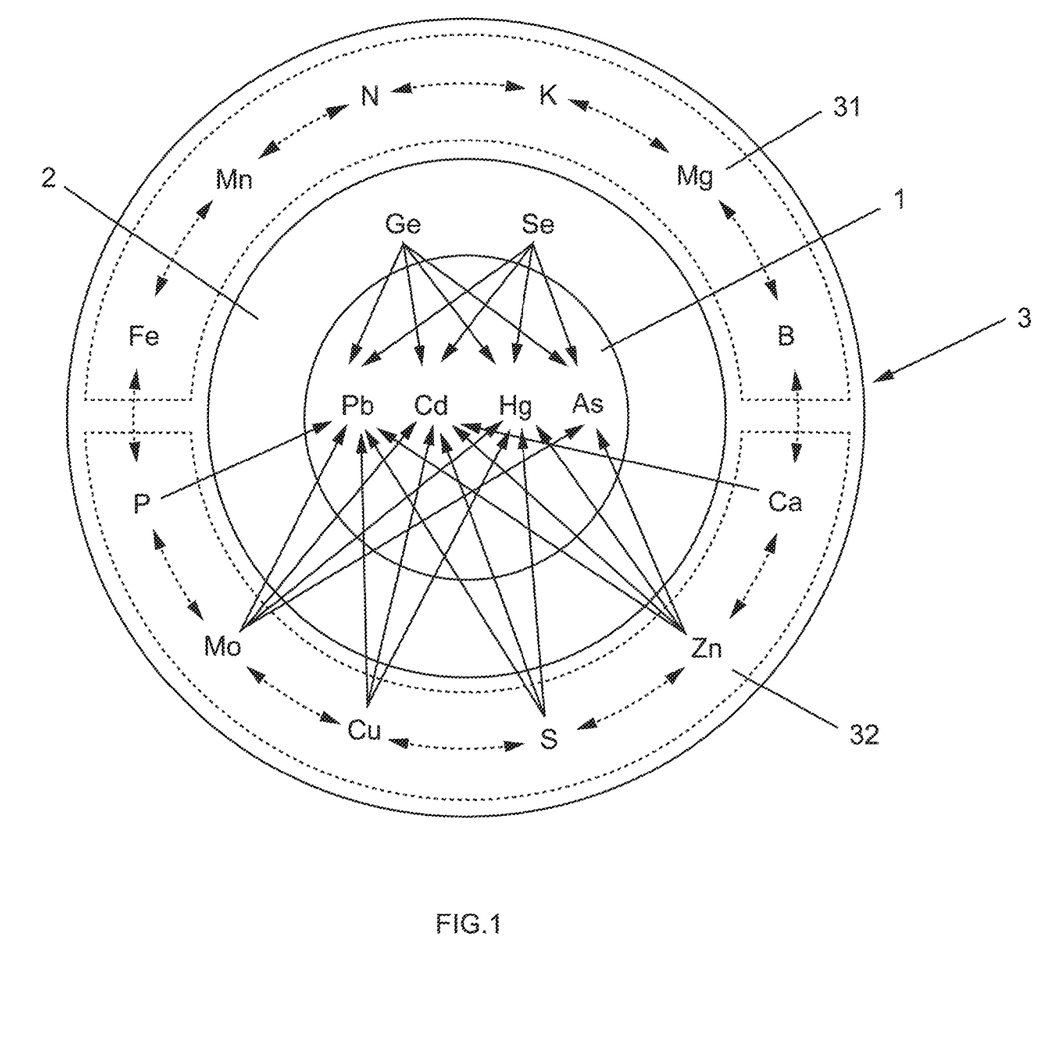
FIG. 1 is a schematic relationship view of reciprocity between antagonistic minerals according to the present invention.
Figure 7:
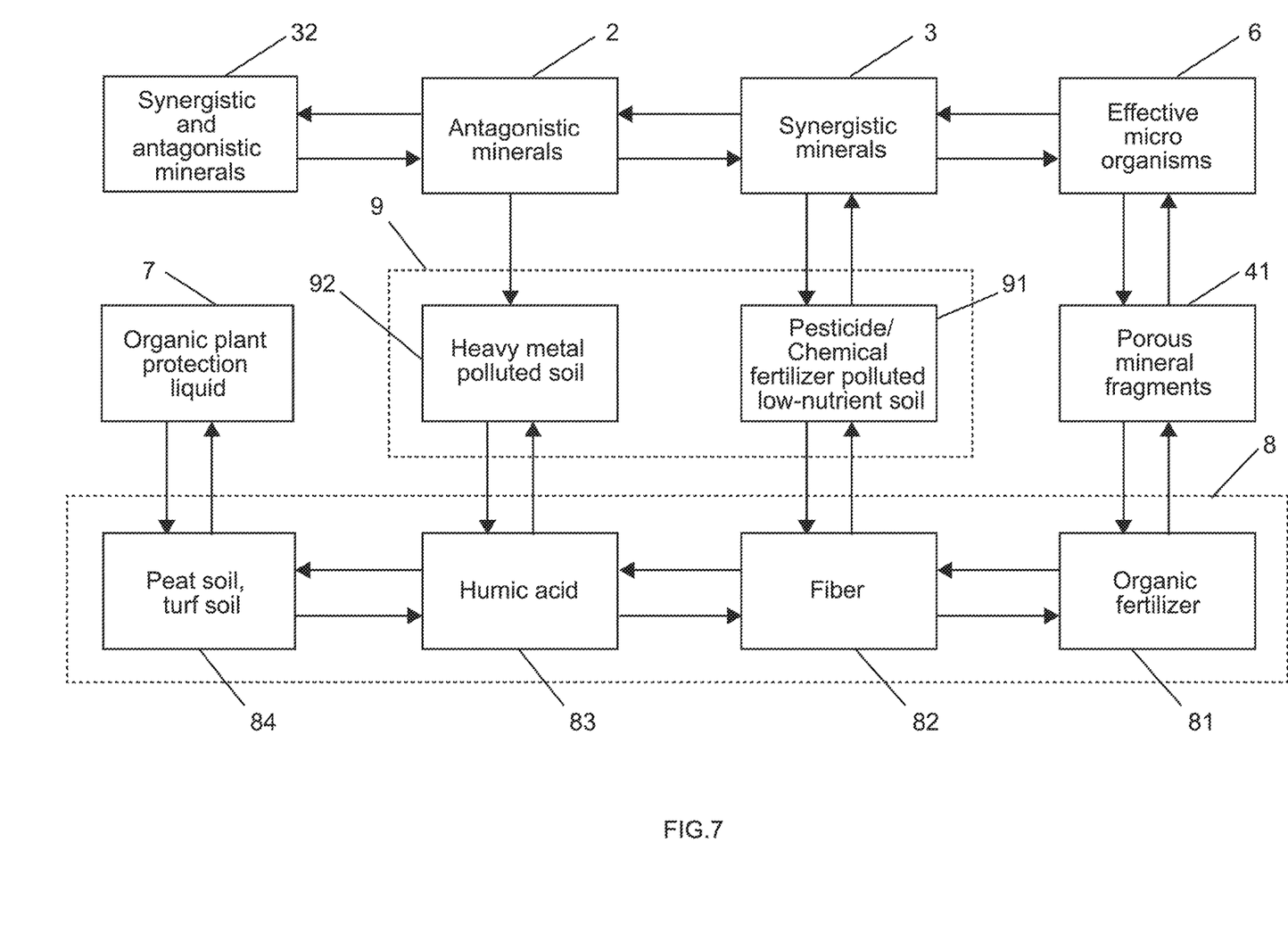
FIG. 7 shows a relationship flow chart of the effects of the soil restoration method of the present invention.

Referring to FIG. 1, which shows a schematic relationship view of reciprocity between antagonistic minerals according to the present invention, wherein the so-called antagonistic minerals refer to certain elements provided with the effects to control farm crops absorbing other elements, such mutual opposition effects are called antagonistic effects. Referring to FIG. 7, which shows a relationship flow chart of the soil restoration effects of the present invention, wherein an organic material 8 primarily applies material from the natural world comprising an organic fertilizer 81, fiber 82, humic acid 83, and peat soil/turf soil 84.

According to what has been described above, under conditions in which soil contains heavy metal elements, the characteristics of micronutrients and physical potential (electrolyte) are used to enable changing the electrovalence of the elements through an antagonistic (exchange) effect between elements, thereby controlling the development function of the elements and enabling restoration of heavy metal polluted soil 92. Accordingly, even if heavy metal elements harmful to the human body exist in soil 9, they will not be absorbed during the process of plant growth. Heavy metals generally refer to metals having a relatively large specific weight (greater than 5), and include cadmium, chromium, copper, mercury, nickel, lead, aluminum, and zinc. In addition, although arsenic is a non-metal, however, because of its physiochemical and metal like properties, it is classified as a heavy metal. Among the heavy metals, arsenic, cadmium, chromium, mercury, and lead are not elements required for plant growth, and directly poison crop products if an excessive amount of such heavy metals is absorbed, as well as indirectly effecting the safety of food products.

Referring to FIG. 1, which shows heavy metal elements 1 defined by the present invention that include arsenic (As), mercury (Hg), cadmium (Cd), and lead (Pb) commonly seen in agricultural cultivated soil. FIG. 1 further depicts antagonistic minerals 2 including germanium (Ge) and selenium (Se), and synergistic minerals 3 comprise synergistic non-antagonistic minerals 31 and synergistic and antagonistic minerals 32. The synergistic non-antagonistic minerals 31 comprise: mineral elements including iron (Fe), manganese (Mn), nitrogen (N), potassium (K), magnesium (Mg), and boron (B); whereas the synergistic and antagonistic minerals 32 comprise: phosphorus (P), molybdenum (Mo), copper (Cu), sulphur (S), zinc (Zn), and calcium (Ca).

As shown in FIG. 1, single arrowheads between elements indicate an antagonistic effect, for example: selenium, zinc, germanium, molybdenum, sulphur, copper, calcium, and phosphorus produce an antagonistic effect on the absorption of the heavy metals arsenic, cadmium, mercury, and lead; selenium produces an antagonistic effect on the absorption of the heavy metals arsenic, cadmium, mercury, and lead; zinc produces an antagonistic effect on the absorption of the heavy metals arsenic, cadmium, mercury, and lead; germanium produces an antagonistic effect on the absorption of the heavy metals arsenic, cadmium, mercury, and lead; molybdenum produces an antagonistic effect on the absorption of the heavy metals arsenic, cadmium, mercury, and lead; sulphur produces an antagonistic effect on the absorption of the heavy metals cadmium, mercury, and lead; copper produces an antagonistic effect on the absorption of the heavy metals cadmium, mercury, and lead; calcium produces an antagonistic effect on the absorption of the heavy metal cadmium; and phosphorus produces an antagonistic effect on the absorption of the heavy metal lead.

The soil restoration method of the present invention applied to heavy metal polluted soil comprises the following steps:

First step: Testing soil condition and determine whether heavy metal pollutants are present.

Second step: Testing the heavy metal elements that have polluted the soil and collect related data.

Third step: When the heavy metal pollutants include at least one of the elements including mercury, cadmium, arsenic, and lead; based on the conditions and data of the first step and the second step, decide which mineral elements to add that provide the required antagonistic effects, including at least more than two of the elements: selenium (Se), molybdenum (Mo), germanium (Ge), zinc (Zn), sulphur (S), copper (Cu), and calcium (Ca); and at the same time add o the polluted soil mineral elements that provide the required synergistic effects, including at least more than one of the elements manganese (Mn), calcium (Ca), copper (Cu), magnesium (Mg), molybdenum (Mo), zinc (Zn), nitrogen (N), boron (B), phosphorus (P), iron (Fe), and potassium (K).

Fourth step: Based on the conditions and data of the first step and the second step, decide which photosynthetic organisms among effective micro organisms 6 to add, and at least more than one lactic acid organism, yeast organism, actino-organism, and fermentative filamentous flora; wherein the proportion of each group of photosynthetic organisms of the effective micro organisms 6 account for 10 to 20%, lactic acid organisms account for 20 to 30%, yeast organisms account for 20 to 30%, actino-organisms account for 10 to 20%, and fermentative filamentous flora account for 10 to 20%. And Fifth step: Based on the conditions and data of the first step and the second step, decide to add porous mineral fragments 41 and an organic plant protection liquid 7. Proportions added are 10% to 20% of the effective micro organisms 6, 40% to 60% of the porous mineral fragments 41, and 30% to 40% of the organic plant protection liquid 7. A porous mineral main body 4 is composed of silicon oxide and aluminum oxide, and further comprises either diatomaceous earth (infusorial earth) or zeolite.

After micronization of the porous mineral main body 4 through a breaking process, the size of each of the porous mineral fragments 41 is approximately 50 to 70 mesh. The porosity characteristic of the structure of the porous mineral fragments 41 and good absorption capacity are used to achieve absorbing minerals, microorganisms, and the organic fertilizer 81, enabling slow and controlled release in the soil. Pollution conditions of the heavy metal polluted soil 92 differ, for example: when it is discovered that soil is polluted with arsenic (As), a mixture of the four elements selenium, zinc, germanium, and molybdenum totaling approximately 200 to 300 kg/hectare is applied to the soil, with the addition of the organic fertilizer 81 totaling approximately 1800 to 3000 kg/hectare uniformly spread onto the soil and the soil turned over, which enables adjusting the arsenic poisoning of the soil and plants. When it is discovered that soil is polluted with mercury (Hg), a mixture of the six elements selenium, zinc, germanium, molybdenum, sulphur, and copper totaling approximately 200 to 300 kg/hectare is applied to the soil. When it is discovered that soil is polluted with cadmium (Cd), a mixture of the seven elements selenium, zinc, germanium, molybdenum, calcium, sulphur, and copper totaling approximately 200 to 300 kg/hectare is applied. And when it is discovered that soil is polluted with lead (Pb), a mixture of the seven elements selenium, zinc, germanium, molybdenum, copper, sulphur, and phosphorus totaling approximately 200 to 300 kg/hectare is applied to the soil. Regardless of the above-described conditions, when it is discovered that soil is polluted with any of the hazardous elements arsenic, mercury, cadmium, or lead, approximately 1800 to 3000 kg/hectare of the organic fertilizer 81 must be also applied and uniformly spread onto the soil and the soil turned over to remedy the soil and plants and reduce the hazard from heavy metals. However, formula and proportions are different when the above-described remedies are applied to different plants and crops and must be adapted according to different conditions. In addition, methods such as soil discharging, soil replacement, and turning over of soil can be used to reduce or remove heavy metals; moreover, heavy metal absorbing plants can also be planted to absorb heavy metals, after which appropriate removal and processing is carried out.

Figure 3:
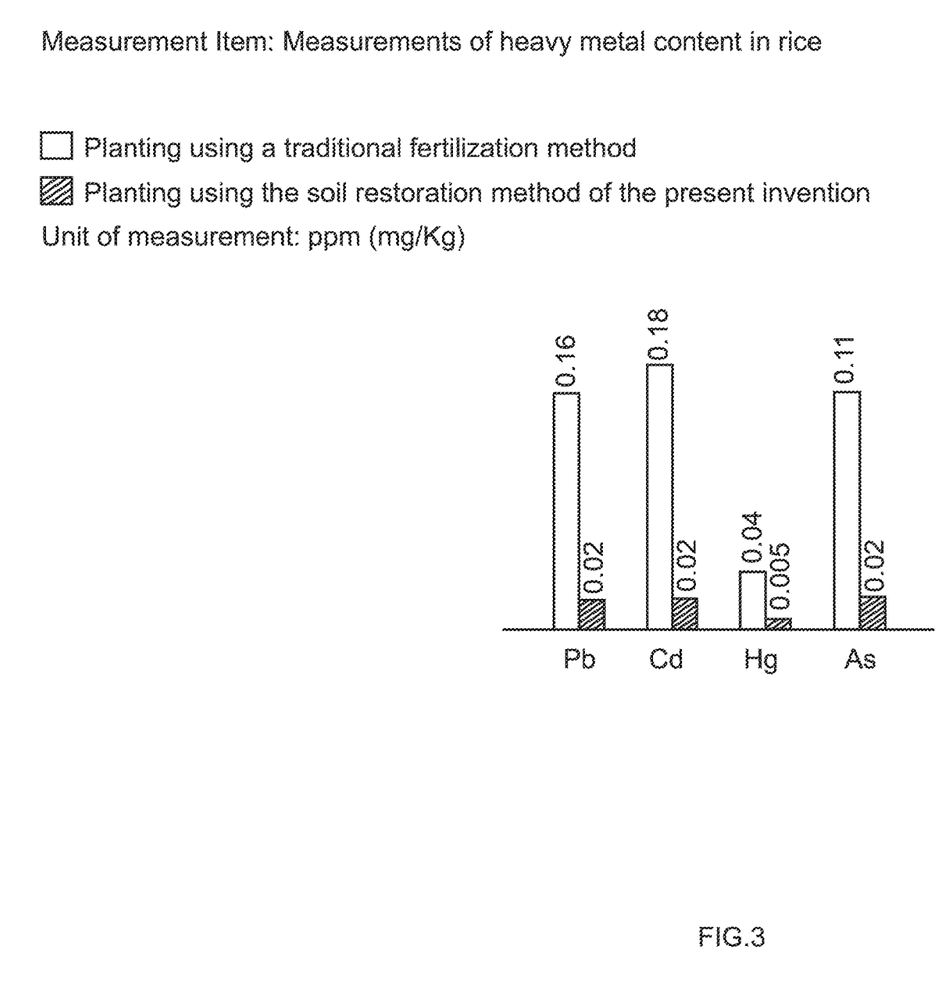
FIG. 3 is a comparison chart comparing application of a heavy metal soil restoration method of the present invention that shows detection data acquired after separately planting rice using an antagonistic method and a traditional fertilization method.

Referring to FIG. 3, which shows a comparison chart comparing the restoration method of the present invention applied to the heavy metal polluted soil 92 that details data acquired after separately planting rice using the antagonistic method of the present invention and a traditional fertilization method. The inventor of the present invention entrusted the organization "SGS Taiwan Co. Limited" that provides professional inspection services to produce the comparison chart after taking measurements of the rice. As shown in FIG. 3, the two planted crops were rice, and after measurements were carried out, numerical comparison of residual heavy metal elements present in the rice was as follows:

The heavy metal content present in rice planted using a traditional fertilization method approximately exceeded 5 to 9 times that present in rice planted using the antagonistic restoration method as applied by the present invention; wherein: lead content exceeded 8 times (0.16 ppm/0.02 ppm), cadmium content exceeded 9 times (0.18 ppm/0.02 ppm), mercury content exceeded 8 times (0.04 ppm/0.005 ppm), and arsenic content exceeded 5.5 times (0.11 ppm/0.02 ppm). Hence, the results verify that the heavy metal content present in rice grown applying the antagonistic restoration method of the present invention is far below that using the traditional fertilization method, thus effectively achieving the object that plants will not absorb heavy metal elements harmful to the human body present in the soil during the process of plant growth. Accordingly, crops produced will also not contain heavy metal elements harmful to the human body; moreover, the restoration method effectively remedies soil structure enabling soil restoration.

and further strengthens crop nutrition and quality, as well as increasing output, thus achieving the object of sustainable use of agricultural land.

Figure 2:
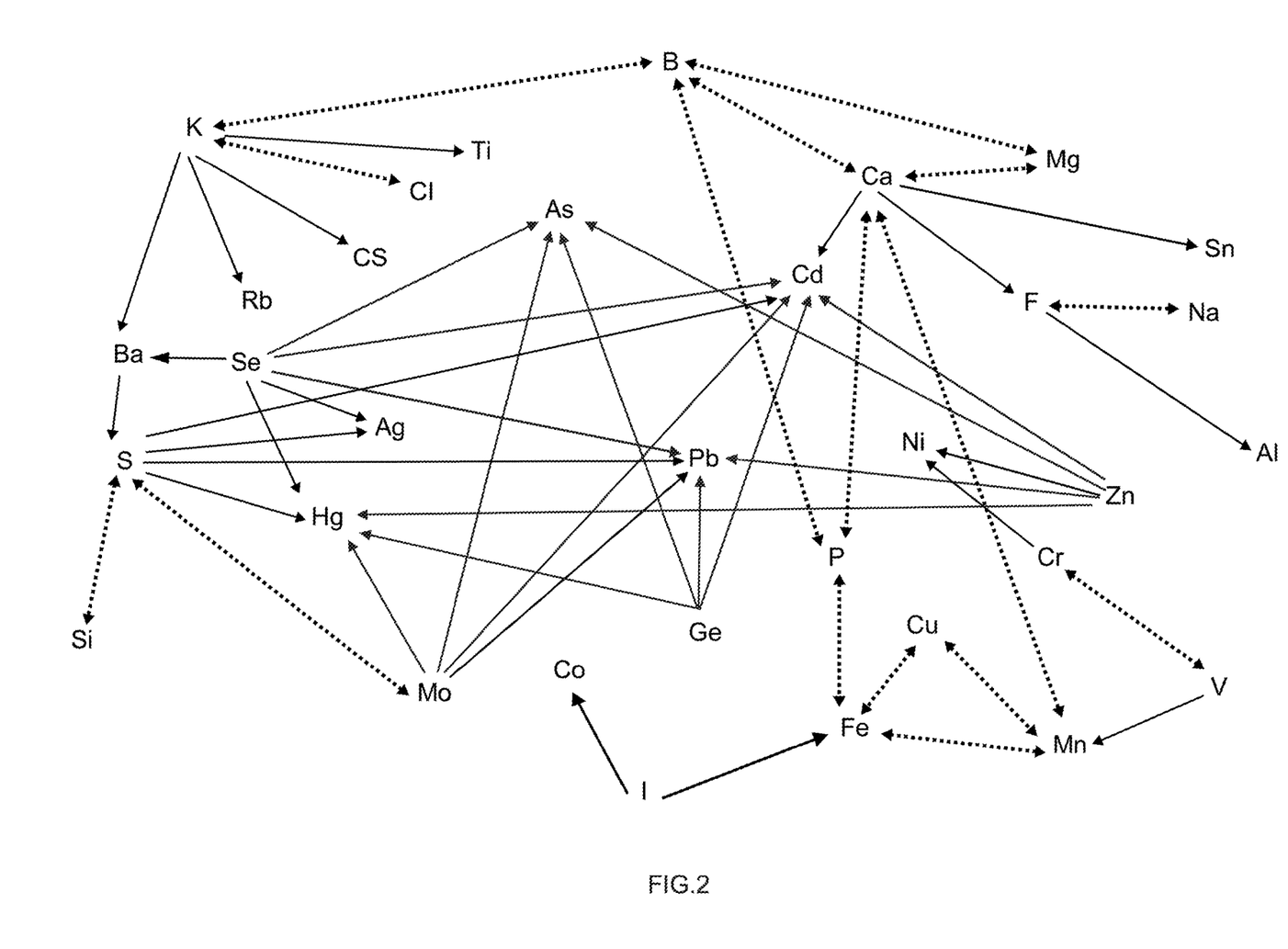
FIG. 2 is a schematic relationship view of reciprocity between synergistic minerals and antagonistic minerals according to the present invention.

Referring to FIG. 2, which shows the at least sixteen types of nutrient elements currently known necessary for plant growth, including carbon (C), hydrogen (H), oxygen (O), nitrogen (N), phosphorus (P), potassium (K), calcium (Ca), magnesium (Mg), sulphur (S), iron (Fe), manganese (Mn), zinc (Zn), copper (Cu), boron (B), molybdenum (Mo), and chlorine (Cl), which, according to the amount of each element required for plants, can be divided into macronutrients and micronutrients. Carbon (C), hydrogen (H), oxygen (O), nitrogen (N), phosphorus (P), potassium (K), calcium (Ca), magnesium (Mg), and sulphur (S) are all macronutrients necessary for plant growth; copper (Cu), manganese (Mn), zinc (Zn), iron (Fe), molybdenum (Mo), boron (B), and silicon (Si) are all micronutrients necessary for plant growth. The above mentioned elements are in an ionic inorganic form that are absorbed by the plants, thus, the water soluble organic fertilizer 81 must be used on the plants, only then can the ions be absorbed by plants roots using methods including a diffusion effect, cytoplasmic streaming, and active transport.

Regarding plant growth, large amounts of elements including carbon (C), hydrogen (H), oxygen (O), nitrogen (N), phosphorus (P), and potassium (K) are required to construct organic components of the plants and form the basic framework thereof. Plants can acquire the elements carbon, hydrogen, and oxygen from the air and water, or from the soil; and acquire the elements nitrogen, phosphorus, and potassium from the organic fertilizer 81 in the growth medium. Mineral micronutrients are essential elements for plant growth requiring only very small amounts, but are indispensable for plant physiology, and therefore called micronutrients. Farm crops absorb the appropriate amount of mineral micronutrients to maintain cultivation thereof, however, plants absorbing either an insufficient or an excessive amount of micronutrients will result in obstruction in the plants' physiology.

Apart from the aforementioned 16 nutrient elements, there is also a category of beneficial elements which have a good effect on the growth and development of some plants, or are necessary for some plants under specific conditions; however, they are not necessary for all plants. The main beneficial elements comprise: silicon (Si), sodium (Na), cobalt (Co), selenium (Se), nickel (Ni), and aluminium (Al); examples of their use include: paddy rice requires silicon, nitrogen fixing crops require cobalt, and beet requires sodium. Based on current research, the basic requirements for plant growth include the above-mentioned more than 16 nutrient elements and other beneficial elements, however, during the process of plant growth, the absorption and conversion efficiency of individual elements on plants is limited. And due to the close connection between elements, many synergistic effects must proceed in order for the elements to exert their effects.

So called synergistic effects involve two types or more than two types of element effects, with the mutual effects between elements achieving a multiplicative strengthening effect. Such reciprocity between elements enables producing synergistic effects of elements, wherein reciprocity between some elements also concurrently producing antagonistic effects. Referring to FIG. 2, wherein a synergistic effect between two elements is indicated by two-way arrows with dotted lines; an antagonistic effect between two elements is indicated by one-way arrows with full lines. Source of the aforementioned mineral elements is mainly from ore extraction rich in mineral elements, wherein relatively large ore is first mechanically broken into pieces to become relatively small ore. The process involves subjecting the large ore to high temperature sintering at about 800 degrees to enable the large ore to be easily broken into small pieces; a crushing process then grinds the small pieces into a powder form, from which the required mineral elements are refined.

Referring again to FIG. 2, together with reference to FIG. 8, the restoration method of the present invention applied to pesticide or chemical fertilizer polluted low-nutrient soil 91 comprises the following steps:

First step: Testing whether or not the soil is low-nutrient soil, pH value of the soil, water content, and collect data;

Second step: Testing and collecting data on the condition of cultures and microorganisms in the soil;

Third step: Testing and collecting data on the condition of minerals in the soil;

Fourth step: Based on the conditions and data from the first step, the second step, and the third step, decide to add at least one type from among the organic fertilizer 81, the fiber 82, the humic acid 83, the peat soil/turf soil 84; accordingly making a neutralization adjustment of the pH value of the soil;

Fifth step: Based on the conditions and data from the first step, the second step, and the third step, decide to add to the soil at least more than two types of the following mineral elements to produce the required synergistic effects: manganese (Mn), calcium (Ca), copper (Cu), magnesium (Mg), molybdenum (Mo), zinc (Zn), nitrogen (N), boron ((B), phosphorus (P), iron (Fe), and potassium (K).

Sixth step: Based on the conditions and data from the first step, the second step, and the third step, decide to add photosynthetic organisms among the effective micro organisms 6, and at least more than one type of lactic acid organism, yeast organism, actino-organism, and fermentative filamentous flora.

Seventh step: Based on the conditions and data from the first step, the second step, and the third step, decide to further add the porous mineral fragments 41 and the organic plant protection liquid 7; wherein the effective micro organisms 6 account for 10% to 20% of the total amount added, the porous mineral fragments 41 account for 40% to 60% of total amount added, and the organic plant protection liquid 7 accounts for 30% to 40% of the total amount added. And Eighth step: Based on the conditions and data of the steps 1 to 3, for every ⅙ an acre of soil, decide to use 120~200 kg of the liquid organic fertilizer 81 with the addition of 10~20 kg of a mixture of mineral elements comprising manganese (Mn), calcium (Ca), copper (Cu), magnesium Mg), molybdenum (Mo), zinc (Zn), nitrogen (N), boron (B), phosphorus (P), iron (Fe), and potassium (K). After placing into the soil and turning the soil over, for every ⅙ an acre of soil, allow 1 kg of the effective micro organisms 6 diluted 800~1000 times with water to flow into the soil every 3~4 weeks to enable absorption by the plant roots. In total using 3~4 kg of the effective micro organisms 6 in 3~4 separate applications.

Because of the different circumstances in which the low-nutrient soil 91 is polluted with pesticides or chemical fertilizers, the restoration method used also varies, for example: soil areas polluted with iron require the application of lime, and also require the use of the organic material 8 to adjust the pH value of the soil; moreover, approximately 50 to 100 kg/hectare of manganese dioxide ($MnO_2$) is also applied to adjust the ratio of iron and manganese in the plants and reduce the iron pollution. Soil areas polluted with manganese require the application of lime, or the application of ferric sulfate and gypsum. Soil areas polluted with boron require using the organic material 8 to adjust the pH value of the soil to between 5.5 and 6.0; moreover, prior to planting, irrigation water with a low content of boron must be used to away the excessive amount of boron in the soil. And soil containing high amounts of chlorine requires carrying out repeated fresh water irrigation over a long period of time to wash and drain away the chlorine; moreover, organic matter must also be added. Formula and proportions of the above-described elements are different when used with different plants and farm crops, thus requiring adaptation according to different conditions.

Figure 4:
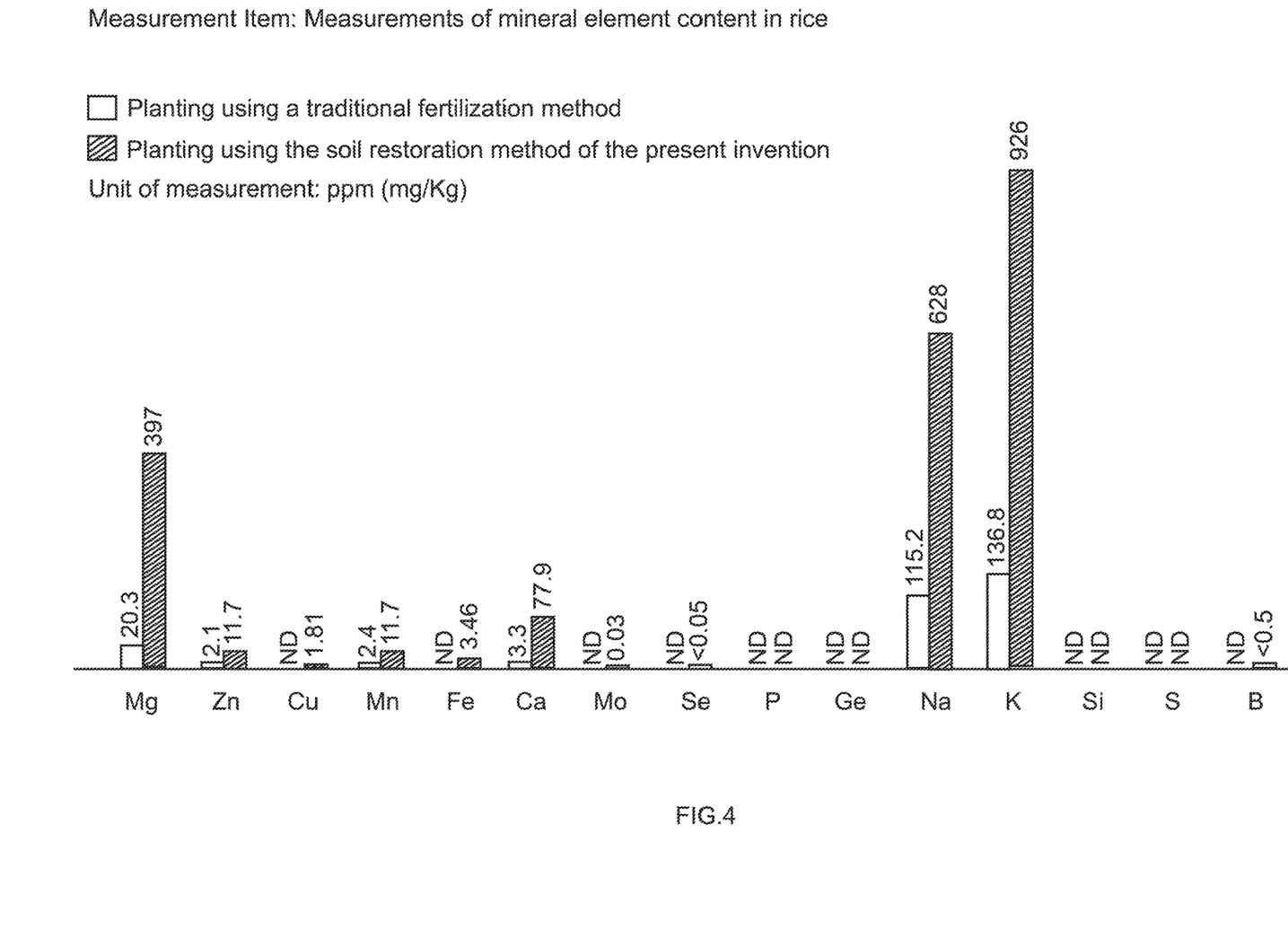
FIG. 4 is a comparison chart comparing application of the restoration method of the present invention to low-nutrient soil that shows detection data acquired after separately planting rice using a synergistic method and a traditional fertilization method.

Referring to FIG. 4, which shows a comparison chart comparing application of the restoration method of the present invention to the low-nutrient soil 91 that shows detection data acquired after separately planting rice using a synergistic method and a traditional fertilization method. The inventor of the present invention entrusted the organization "SGS Taiwan Co. Limited" that provides professional inspection services to produce the comparison chart after taking measurements of the rice. As shown in FIG. 4, the two planted crops were rice, and after measurements were carried out, numerical comparison of mineral element content present in the rice was as follows:

An overwhelming majority of the mineral nutrient element content detected shows a several fold difference in the rice grown applying the synergistic effect of the present invention compared to the mineral nutrient element content detected in the rice grown using a traditional fertilization method, for example: magnesium (Mg) shows a 19.55 fold (397 ppm compared to 20.3 pm) difference, zinc (Zn) shows a 5.5 fold (11.7 ppm compared to 2.1 ppm) difference, copper (Cu) shows a 1.81 fold (1.81 ppm compared to ND (not detected)) difference, manganese (Mn) shows a 4.88 fold (11.7 ppm compared to 2.4 ppm) difference, iron (Fe) shows a 3.46 fold (3.46 ppm compared to ND (not detected)) difference, calcium (Ca) shows a 23.6 fold (77.9 ppm compared to 3.3 ppm) difference, sodium (Na) shows a 5.45 fold (628 ppm compared to 115.2 ppm) difference, and potassium (K) shows a 6.77 fold (926 ppm compared to 136.8 ppm) difference. Hence, the results verify that the overwhelming majority of mineral nutrient element content detected in the rice grown applying the synergistic effect of the present invention is several fold higher than the mineral nutrient element content detected in the rice grown using a traditional fertilization method; moreover, some of the mineral content even achieves a more than double-digit fold difference.

Figure 5:
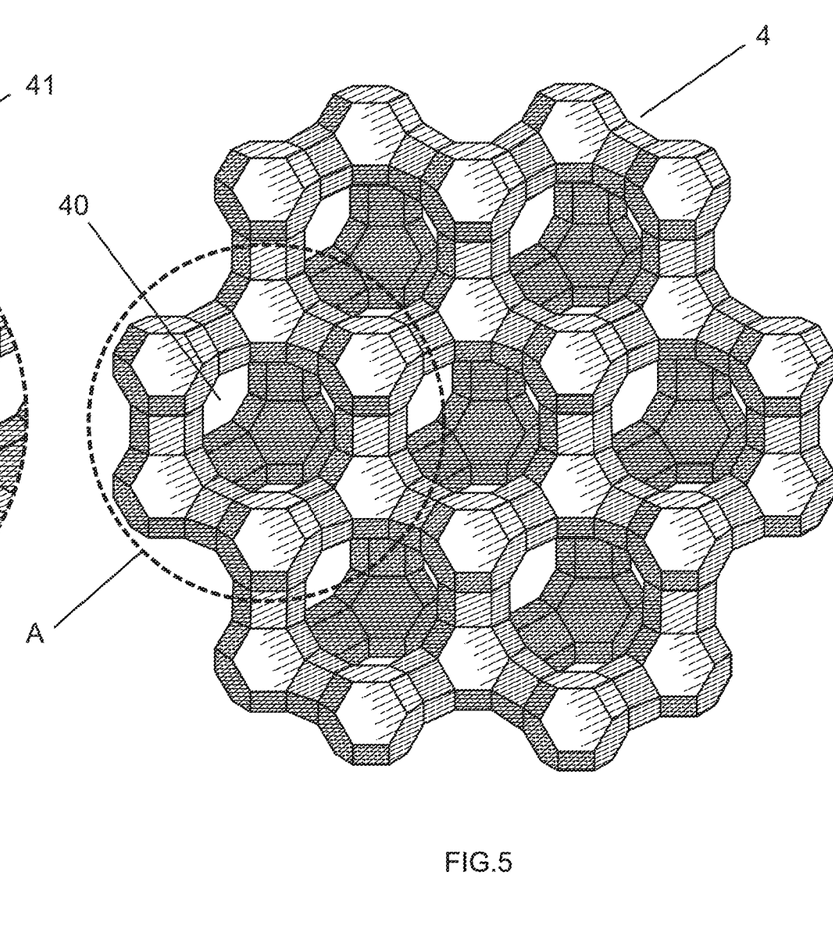
FIG. 5 shows a schematic view of a structure made from porous minerals as applied by the present invention.
Figure 5A:
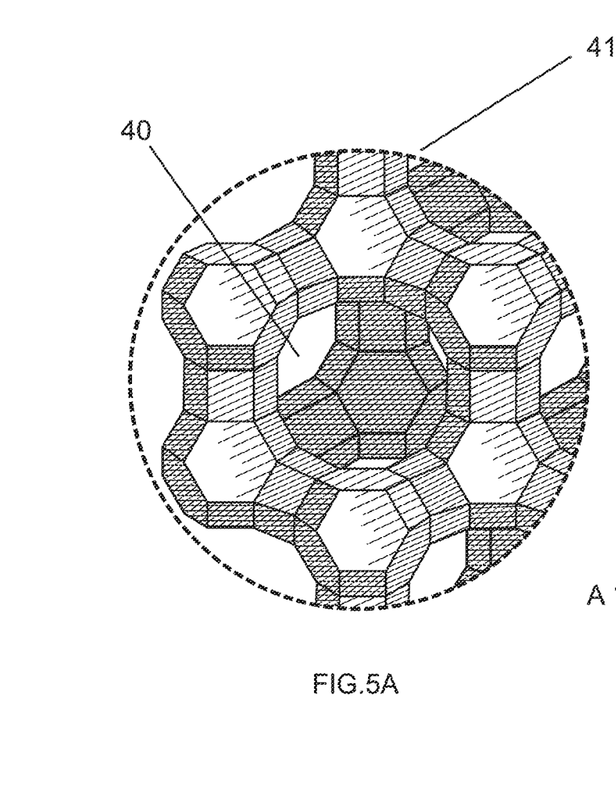
FIG. 5A is a partial enlarged schematic view of the porous minerals depicted in FIG. 5.
Figure 6:
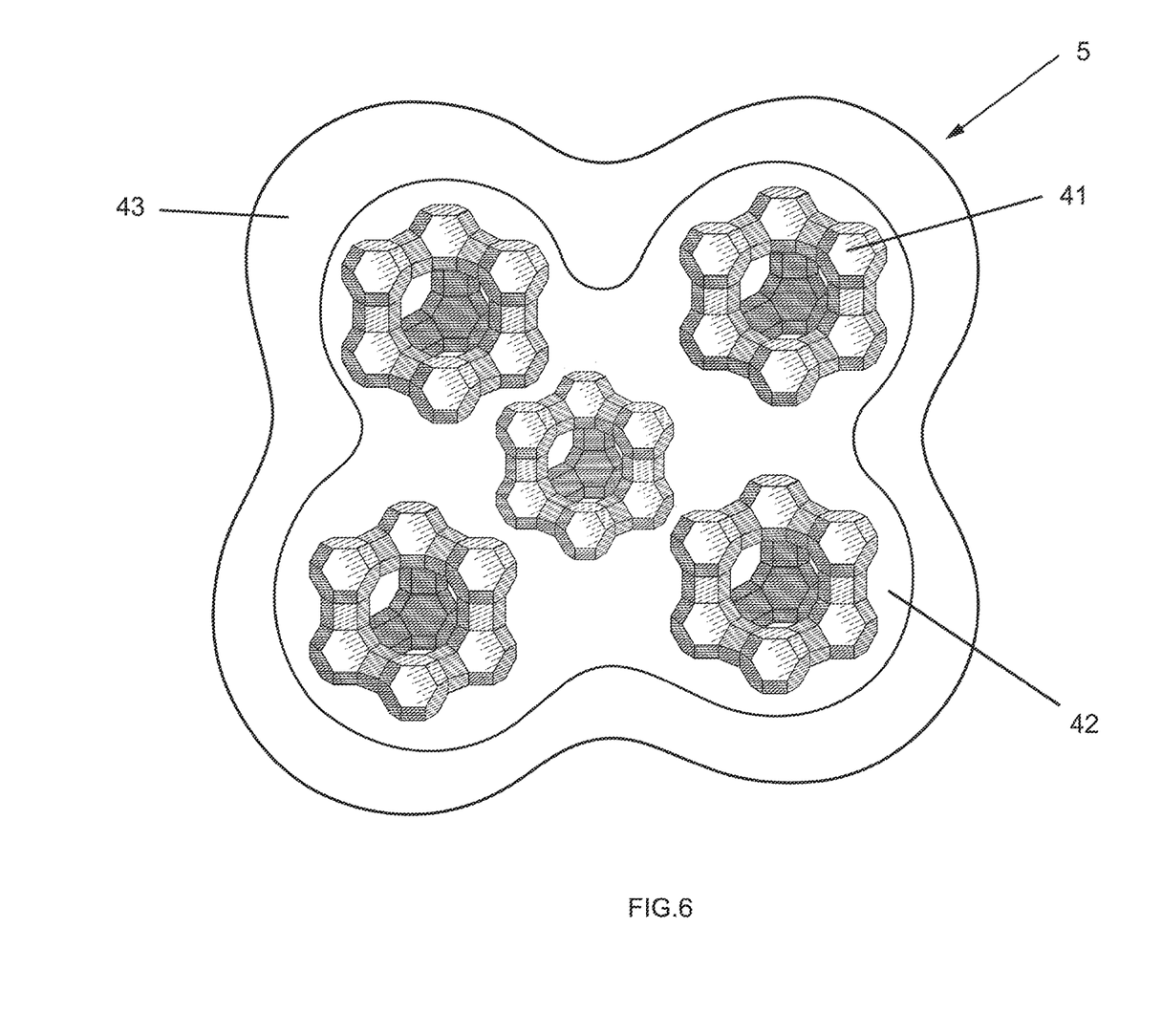
FIG. 6 shows a schematic view of the structure used in the soil restoration method of the present invention.

Referring to FIGS. 5, 5A, and 6, together with reference to FIG. 7, to enable the extensive application of the restoration method in the low-nutrient soil 91 polluted with pesticides or chemical fertilizers in farm land and effectively enable implementation thereof, the restoration method has been specifically productized, enabling the use of a storage method for storing a reserve and to convenience delivery thereof for managing soil plowing and restoration requirements. Hence, another concrete embodiment of the present invention applies the above-described method in product manufacturing formulation to produce a soil restoration structure 5.

The structure 5 comprises:

A plurality of the porous mineral fragments 41, wherein the dimensions of each porous mineral fragment 41 is approximately 50 to 70 mesh. The porous mineral fragments 41 have water absorption properties (hygroscopicity) and assume irregular broken shapes, with the structural annular surfaces of the fragment pieces provided with internal holes or channel structures. The plurality of porous mineral fragments 41 are formed by micronization of the porous mineral main body 4 using a breaking process, and the structural annular surface of each of the porous mineral fragments 41 is formed with the different sized internal holes and channels. After undergoing heating at over 80 degrees and dehydration processing, 20% of moisture absorbed in the porous mineral fragments 41 is removed; the temperature is then allowed to fall, when the liquid organic fertilizer 81 with molecules of appropriate size is added, which is absorbed by the porous mineral fragments 41, making it difficult for the liquid organic fertilizer component to run off, and application in the soil 9 enables a continued supply of the appropriate amount of nutrients required for farm crops.

More than two of the mineral elements required to provide synergistic effects from among the mineral elements: iron, nickel, manganese, copper, zinc, boron, molybdenum, sodium, magnesium, aluminium, silicon, phosphorus, sulphur, potassium, calcium, scandium, titanium, chromium, vanadium, gallium, selenium, germanium, lanthanum, samarium, cobalt, iodine, and tin.

Photosynthetic organisms from among the effective micro organisms 6, and at least more than one lactic acid organism, yeast organism, actino-organism, and fermentative filamentous flora.

A composite layer 42, which is formed from a mixture of the fiber 82, the organic fertilizer 81, and the organic plant protection liquid 7 is used to cover the porous mineral fragments 41 made up from a mixture of the above-described mineral elements, the effective micro organisms 6, the fiber 82, the organic fertilizer 81, and the organic plant protection liquid 7, thereby achieving the effect to make it difficult for the minerals, microorganisms, and the organic fertilizer 81 to run off, as well as enabling controlled release of the above-described components in the soil 9 to benefit the restoration application of the soil 9. And An adhesion layer 43, which is formed from an excipient made from starch material blended with water that is intermixed with the above-described porous mineral fragments 41 to enable producing synergistic effects between the mineral elements, the effective micro organisms 6, and the composite layer 42. The adhesion layer 43 is used to adhere and combine the above-described components to facilitate storage and application of the structures 5.

The manufacturing process of the structure 5 comprises the following steps:

First step: Mixing the porous mineral fragments 41 with the fiber 82, the organic fertilizer 81, and the organic plant protection liquid 7.

Second step: Mixing with at least more than two of the following mineral elements to produce the required synergistic effects: iron, nickel, manganese, copper, zinc, boron, molybdenum, sodium, magnesium, aluminium, silicon, phosphorus, sulphur, potassium, calcium, scandium, titanium, chromium, vanadium, gallium, selenium, germanium, lanthanum, samarium, cobalt, iodine, and tin.

Third step: Mixing with photosynthetic organisms from among the effective micro organisms 6 and at least more than one lactic acid organism, yeast organism, actino-organism, and fermentative filamentous flora.

Fourth step: Adding a hydrating excipient to form chunks or strips. And

Fifth step: Cutting the formed chunks or strips to form small pieces or crumble to form granules.

When the structures 5 of the above-described soil restoration are applied to the heavy metal polluted soil 92, based on tests to determine which heavy metal elements are polluting the soil and related data, more than two of the following mineral elements must be further added to produce the required antagonistic effects; selenium (Se), molybdenum (Mo), germanium (Ge), zinc (Zn), sulphur (S), copper (Cu), and calcium (Ca).

Regardless of whether the above-described restoration method is applied to the heavy metal polluted soil 92 or the pesticide or chemical fertilizer polluted soil 91, or the restoration structures 5 are applied to the soil 9 and manufacturing process thereof, all require further addition of the effective micro organisms 6 to improve restoration of the soil 9. The effective micro organisms 6 comprise photosynthetic organisms and at least more than one lactic acid organism, yeast organism, actino-organism, and fermentative filamentous flora, wherein the photosynthetic organisms primarily use light energy, and use carbon dioxide or organic effects as the carbon source for plant growth and development. If the number of photosynthetic organisms in the soil increases, then the quantity of other effective micro organisms will also increase. Hence, photosynthetic organisms are the main organisms among the effective micro organisms, and play the role of producing mutual effects with the above-described other organisms.

Moreover, the sugars acquired by the lactic acid organisms from among the photosynthetic organisms and yeast organisms are the base material to produce lactic acid, which enable effective control of the movement of harmful microorganisms, and benefit the increase of humus in the soil. Yeast organisms use the secretions and photosynthetic organisms produced by plant roots to synthesize amino acids and sugars, which benefit the multiplication of other valuable micro organisms, such as lactic acid organisms and actino-organisms.

Furthermore, mixing actino-organisms and photosynthetic organisms enables bringing about a multiplication of anti-organism effects. As for fermentative filamentous flora, they are able to coexist with other microorganisms, produce a particularly good effect on esters in the soil, and prevent the occurrence of maggots or other harmful insects, as well as being effective against decomposition stench.

Regarding application of the above-described restoration method in the heavy metal polluted soil 92, or pesticide or chemical fertilizer polluted low-nutrient soil 91, or application of the restoration structures 5 in the soil 9 and manufacturing process thereof, the proportion of each organism group of the effective micro organisms 6 is respectively 10 to 20% of photosynthetic organisms, 20 to 30% of lactic acid organisms, 20 to 30% of yeast organisms, 10 to 20% of actino-organisms and 10 to 20% of fermentative filamentous flora. The organic fertilizer 81 comprises materials/compounds including at least one of compost, lime, oyster shell powder, calcium superphosphate, ferric oxide, zinc oxide, manganese oxide, calcium hydrophosphate, and calcium carbonate. The fiber 82 comprises agricultural and animal husbandry waste material, including rice straw, wheat straw, root stalks, and leaves or weeds. The porous mineral main body 4 is composed of silicon oxide and aluminum oxide, comprising either diatomaceous earth (infusorial earth) or zeolite. And after micronization of the the porous mineral main body 4 using a breaking process, the dimensions of the porous mineral fragments 41 are approximately 50 to 70 mesh.

In addition, the main components of the above-described organic plant protection liquid 7 comprise at least one of the compounds including matrine ($C_{15}H_{24}ON_2$), oxymatrine ($C_{16}H_{24}O_2H_2$), prolactin ($C_{11}H_6O_6$). In addition, total content of the main components is 0.6%, specific weight is 0.98 to 1.02 (20 degrees C./4 degrees C.) of aqueous solution; and secondary components of the organic plant protection liquid 7 comprise at least one of the fluids including sophora alkali fluid, arbor-vitae fluid (*Platycladus orientalis*), delphinium grandiflorum fluid, populus alba decoction fluid, cogon grass decoction fluid (*Imperata cylindrical*), belladonna solution, red chilli fluid, and fennel fluid. Moreover, total content of the secondary components is 0.3%, and specific weight is 0.98 to 1.02 (20 degrees C./4 degrees C.) of aqueous solution. Using the porous mineral fragments 41, which have been formed by micronization, cutting and breaking into pieces, enables the elimination of insect bodies that come into contact therewith through the physiological damaging effects of dissection; while at the same time using the natural physio and chemical characteristics of Chinese medical herbs and plants contained in the organic plant protection liquid 7 enable improving safety and increasing the effectiveness of disinsection.

According to what has been described above, the photosynthetic organisms, lactic acid organisms, yeast organisms, actino-organisms, and fermentative filamentous flora contained in the effective micro organisms 6, have a mutual effect relationship; the antagonistic effects and synergistic effects between mineral elements are also able to produce complimentary effectiveness, which supplement the organic plant protection liquid 7. Furthermore, disinsection effectiveness and control effect of the micronized porous mineral fragments 41 enable restoring soil fertility of the soil 9, providing the soil 9 with a rich content of a plurality of minerals and micronutrients. Referring to the flow chart shown in FIG. 7, all of the above-described mutual effects and mutual relationships enable effective remedying and structural restoration of the soil 9, further strengthening farm crop nutrition and quality, as well as increasing output, thus achieving the object of sustainable use of agricultural land.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A soil restoration method, being applied to heavy metal polluted soil, comprising the following steps:
    a) testing soil condition and determining whether heavy metal pollutants are present;
    b) testing the heavy metal elements that have polluted the soil and collecting data;
    c) when the heavy metal pollutants include at least one of the elements including mercury, cadmium, arsenic, and lead, based on the conditions and data from (a) and (b), deciding which mineral elements to add to the polluted soil to inhibit absorption of other elements, including at least more than two of the elements: selenium (Se), molybdenum (Mo), germanium (Ge), zinc (Zn), sulphur (S), copper (Cu), and calcium (Ca); and at the same time add to the polluted soil mineral elements that provide multiplicative strengthening effect, including at least more than one of the elements manganese (Mn), calcium (Ca), copper (Cu), magnesium (Mg), molybdenum (Mo), zinc (Zn), nitrogen (N), boron (B), phosphorus (P), iron (Fe), and potassium (K); and
    d) based on the conditions and the data from steps (a) and (b), deciding which photosynthetic organisms among effective micro organisms to add, together with at least more than one lactic acid organism, yeast organism, actino-organism, or fermentative filamentous flora, wherein the heavy metal comprises cadmium, chromium, copper, mercury, nickel, lead, aluminum, zinc and arsenic, wherein the photosynthetic organisms use light energy, carbon dioxide or organic effects as a carbon source for plant growth and development.

2. The soil restoration method according to claim 1, wherein, based on the conditions and data from steps (a) and (b), when it is discovered that soil is polluted with arsenic (As), apply a mixture of the four elements selenium, zinc, germanium, and molybdenum to the soil totaling approximately 200 to 300 kg/hectare, with the addition of an organic fertilizer totaling approximately 1800 to 3000 kg/hectare uniformly spread onto the soil and the soil turned over; or when it is discovered that soil is polluted with mercury (Hg), apply a mixture of the six elements selenium, zinc, germanium, molybdenum, sulphur, and copper to the soil totaling approximately 200 to 300 kg/hectare, with the addition of the organic fertilizer totaling approximately 1800 to 3000 kg/hectare uniformly spread onto the soil and the soil turned over; or when it is discovered that soil is polluted with cadmium (Cd), apply a mixture of the seven elements selenium, zinc, germanium, molybdenum, calcium, sulphur, and copper to the soil totaling approximately 200 to 300 kg/hectare, with the addition of the organic fertilizer totaling approximately 1800 to 3000 kg/hectare uniformly spread onto the soil and the soil turned over; or when it is discovered that soil is polluted with lead (Pb), apply a mixture of the seven elements selenium, zinc, germanium, molybdenum, copper, sulphur, and phosphorus to the soil totaling approximately 200 to 300 kg/hectare, with the addition of the organic fertilizer totaling approximately 1800 to 3000 kg/hectare uniformly spread onto the soil and the soil turned over.

3. The soil restoration method according to claim 1, wherein, based on the conditions and data from steps (a) and (b), further add a variety of organism groups of effective micro organisms, the proportion of each organism group being 10 to 20% of photosynthetic organisms, 20 to 30% of lactic acid organisms, 20 to 30% of yeast organisms, 10 to 20% of actino-organisms and 10 to 20% of fermentative filamentous flora.

4. The soil restoration method according to claim 3, wherein, based on the conditions and data from steps (a) and (b), further add porous mineral fragments and an organic plant protection liquid, proportions added are 10% to 20% of the effective micro organisms, 40% to 60% of the porous mineral fragments, and 30% to 40% of the organic plant protection liquid.

5. The soil restoration method according to claim 4, wherein the porous mineral fragments are composed of silicon oxide and aluminum oxide, and further comprise either diatomaceous earth (infusorial earth) or zeolite; after micronization of a porous mineral main body through a breaking process, the size of each porous mineral fragment is approximately 50 to 70 mesh; the structural annular surface of each of the porous mineral fragments is formed with different sized internal holes and channels, and after undergoing heating and dehydration processing, moisture absorbed in the porous mineral fragments is removed; the temperature is then allowed to fall, when the liquid organic fertilizer with molecules of appropriate size is added, which is absorbed by the porous mineral fragments, making it difficult for the liquid organic fertilizer component to run off, and application in soil enables a continued supply of the appropriate amount of nutrients required for crops.

6. The soil restoration method according to claim 4, wherein the main components of the organic plant protection liquid comprise at least one of the compounds including matrine ($C_{15}H_{24}ON_2$), oxymatrine ($C_{16}H_{24}O_2H_2$), and prolactin ($C_{11}H_6O_6$); moreover, total content of the main components is 0.6%, specific weight is 0.98 to 1.02 (20 degrees C./4 degrees C.) of aqueous solution; and secondary components of the organic plant protection liquid comprise at least one of the fluids including sophora alkali fluid, arborvitae fluid (*Platycladus orientalis*), delphinium grandiflorum fluid, populus alba decoction fluid, cogon grass decoction fluid (*Imperata cylindrical*), belladonna solution, red chilli fluid, and fennel fluid; furthermore, total content of the secondary components is 0.3%, and specific weight is 0.98 to 1.02 (20 degrees C./4 degrees C.) of aqueous solution.

7. A soil restoration method, being applied to a low-nutrient soil polluted with pesticides or chemical fertilizers, comprising the following steps:
   a) testing whether or not the soil is low-nutrient soil, pH value of the soil, water content, and collecting data;
   b) testing and collecting data of the condition of cultures and microorganisms in the soil;
   c) testing and collecting data of the condition of minerals in the soil;
   d) based on the conditions and data of steps (a), (b), and (c), decide to add at least one of the following: the organic fertilizer, fiber, humic acid, and peat soil/turf soil; accordingly making a neutralization adjustment of the pH value of the soil;
   e) based on the conditions and data of the steps (a), (b), and (c), decide to add to the soil at least more than two types of the following mineral elements required to produce synergistic effects: manganese (Mn), calcium (Ca), copper (Cu), magnesium (Mg), molybdenum (Mo), zinc (Zn), nitrogen (N), boron (B), phosphorus (P), iron (Fe), and potassium (K);
   f) based on the conditions and data of the steps (a), (b), and (c), decide to add photosynthetic organisms among the effective micro organisms, and at least more than one type of lactic acid organism, yeast organism, actino-organism, and fermentative filamentous flora; and
   g) based on the conditions and data of the steps (a), (b), and (c), decide to further add porous mineral fragments and the organic plant protection liquid; wherein the effective micro organisms account for 10% to 20% of the total amount added, the porous mineral fragments account for 40% to 60% of total amount added, and the organic plant protection liquid accounts for 30% to 40% of the total amount added,
   wherein low-nutrient soil is a soil polluted by heavy metal, pesticides or chemical fertilizers.

8. The soil restoration method according to claim 7, wherein, for every ⅙ an acre of soil, apply 120~200 kg of the organic fertilizer with the addition of 10~20 kg of a mixture of mineral elements comprising manganese (Mn), calcium (Ca), copper (Cu), magnesium (Mg), molybdenum (Mo), zinc (Zn), nitrogen (N), boron (B), phosphorus (P), iron (Fe), and potassium (K); after placing into the soil and turning the soil over, for every ⅙ an acre of soil, allow 1 kg of the effective micro organisms diluted 800~1000 times with water to flow into the soil every 3~4 weeks to enable absorption by the plant roots; in total using 3~4 kg of the effective micro organisms in 3~4 separate applications.

9. The soil restoration method according to claim 7, wherein the proportion of each organism group of the effective micro organisms is 10 to 20% of photosynthetic organisms, 20 to 30% of lactic acid organisms, 20 to 30% of yeast organisms, 10 to 20% of actino-organisms and 10 to 20% of fermentative filamentous flora.

10. The soil restoration method according to claim 7, wherein the organic fertilizer comprises materials/compounds including at least one of compost, lime, oyster shell powder, calcium superphosphate, ferric oxide, zinc oxide, manganese oxide, calcium hydrophosphate, and calcium carbonate; the fiber comprises agricultural and animal husbandry waste material, including rice straw, wheat straw, root stalks, and leaves or weeds.

11. The soil restoration method according to claim 7, wherein the porous mineral fragments are composed of silicon oxide and aluminum oxide, and further comprise either diatomaceous earth (infusorial earth) or zeolite; after micronization of the porous mineral main body through a breaking process, the size of each porous mineral fragment is approximately 50 to 70 mesh; the structural annular surface of each of the porous mineral fragments is formed with different sized internal holes and channels, and after undergoing heating and dehydration processing, moisture absorbed in the porous mineral fragments is removed, the temperature is then allowed to fall, when the liquid organic fertilizer with molecules of appropriate size is added, making it difficult for the liquid organic fertilizer component to run off, and application in soil enables a continued supply of the appropriate amount of nutrients required for crops.

12. The soil restoration method according to claim 7, wherein the main components of the organic plant protection liquid comprise at least one of the compounds including matrine ($C_{15}H_{24}ON_2$), oxymatrine ($C_{16}H_{24}O_2H_2$), and prolactin ($C_{11}H_6O_6$); in addition, total content of the main components is 0.6%, specific weight is 0.98 to 1.02 (20 degrees C./4 degrees C.) of aqueous solution; secondary components of the organic plant protection liquid comprise at least one of the fluids including sophora alkali fluid, arbor-vitae fluid (*Platycladus orientalis*), delphinium grandiflorum fluid, populus alba decoction fluid, cogon grass decoction fluid (*Imperata cylindrical*), belladonna solution, red chilli fluid, and fennel fluid; moreover, total content of the secondary components is 0.3%, and specific weight is 0.98 to 1.02 (20 degrees C./4 degrees C.) of aqueous solution.

13. A soil restoration structure, comprising:
a plurality of the porous mineral fragments, wherein the dimensions of each porous mineral fragment is approximately 50 to 70 mesh; the porous mineral fragments have water absorption properties (hygroscopicity) and assume irregular broken shapes, with the structural annular surfaces of the fragment pieces provided with different sized internal holes and channel structures; more than two mineral elements to produce the required synergistic effects from among the elements: iron, nickel, manganese, copper, zinc, boron, molybdenum, sodium, magnesium, aluminium, silicon, phosphorus, sulphur, potassium, calcium, scandium, titanium, chromium, vanadium, gallium, selenium, germanium, lanthanum, samarium, cobalt, iodine, and tin: photosynthetic organisms from among the effective micro organisms, and at least more than one lactic acid organism, yeast organism, actino-organism, and fermentative filamentous flora;
a composite layer, which is formed from a mixture of fiber, organic fertilizer, and organic plant protection liquid, and is used to cover the different sized holes and channels of the porous mineral fragments after being made up from a mixture of the mineral elements, the effective micro organisms, the fiber, the organic fertilizer, and the organic plant protection liquid, thereby achieving the effect to make it difficult for the minerals, microorganisms, and the organic fertilizer to run off, as well as enabling controlled release of the components in the soil so as to benefit the restoration application thereof; and
an adhesion layer, which is formed from an excipient made from starch material blended with water that is intermixed with a plurality of the porous mineral fragments to enable producing synergistic effects between mineral elements, the effective micro organisms, and the composite layer; the adhesion layer is used to adhere and combine the components to facilitate storage and application of the structures.

14. The soil restoration method according to claim 13, wherein when the soil restoration structures are applied to heavy metal polluted soil, additionally add more than two of the following mineral elements to produce the required antagonistic effects; selenium (Se), molybdenum (Mo), germanium (Ge), zinc (Zn), sulphur (S), copper (Cu), and calcium (Ca).

15. The soil restoration structure according to claim 13, wherein the proportion of each organism group of the effective micro organisms is 10 to 20% of photosynthetic organisms, 20 to 30% of lactic acid organisms, 20 to 30% of yeast organisms, 10 to 20% of actino-organisms and 10 to 20% of fermentative filamentous flora.

16. The soil restoration structure according to claim 13, wherein the organic fertilizer comprises materials/compounds including at least one of compost, lime, oyster shell powder, calcium superphosphate, ferric oxide, zinc oxide, manganese oxide, calcium hydrophosphate, and calcium carbonate; the fiber comprises agricultural and animal husbandry waste material, including rice straw, wheat straw, root stalks, and leaves or weeds.

17. The soil restoration structure according to claim 13, wherein the porous mineral fragments are composed of silicon oxide and aluminum oxide, and further comprise either diatomaceous earth (infusorial earth) or zeolite; after micronization of the porous mineral main body through a breaking process, the size of each porous mineral fragment is approximately 50 to 70 mesh; the structural annular surface of each of the porous mineral fragments is formed with different sized internal holes and channels, and after undergoing heating and dehydration processing, moisture absorbed in the porous mineral fragments is removed, the temperature is then allowed to fall, when the liquid organic fertilizer with molecules of appropriate size is added, making it difficult for the liquid organic fertilizer component to run off, and application in soil enables a continued supply of the appropriate amount of nutrients required for crops.

18. The soil restoration structure according to claim 13, wherein the main components of the organic plant protection liquid comprise at least one of the compounds including matrine ($C_{15}H_{24}ON_2$), oxymatrine ($C_{16}H_{24}O_2H_2$), and prolactin ($C_{11}H_6O_6$); in addition, total content of the main components is 0.6%, specific weight is 0.98 to 1.02 (20 degrees C./4 degrees C.) of aqueous solution; secondary components of the organic plant protection liquid comprise at least one of the fluids including sophora alkali fluid, arbor-vitae fluid (*Platycladus orientalis*), delphinium grandiflorum fluid, populus alba decoction fluid, cogon grass decoction fluid (*Imperata cylindrical*), belladonna solution, red chilli fluid, and fennel fluid; moreover, total content of the secondary components is 0.3%, and specific weight is 0.98 to 1.02 (20 degrees C./4 degrees C.) of aqueous solution.

19. The soil restoration structure according to claim 13, wherein the structure is applied to soil subject to the hazard of heavy metals; when it is discovered that the soil is polluted with the heavy metal arsenic (As), a mixture of the four elements selenium, zinc, germanium, and molybdenum is applied to the soil totaling approximately 200 to 300 kg/hectare; or when it is discovered that the soil is polluted with the heavy metal mercury (Hg), a mixture of the six elements selenium, zinc, germanium, molybdenum, sulphur, and copper is applied to the soil totaling approximately 200 to 300 kg/hectare; or when it is discovered that the soil is polluted with the heavy metal cadmium (Cd), a mixture of the seven elements selenium, zinc, germanium, molybdenum, calcium, sulphur, and copper is applied to the soil totaling approximately 200 to 300 kg/hectare; or when it is discovered that soil is polluted with lead (Pb), a mixture of the seven elements selenium, zinc, germanium, molybdenum, copper, sulphur, and phosphorus is applied to the soil totaling approximately 200 to 300 kg/hectare; when it is discovered that the soil is polluted with any of the hazardous elements arsenic, mercury, cadmium, or lead, approximately 1800 to 3000 kg/hectare of the organic fertilizer must be also applied and uniformly spread onto the soil and the soil turned over.

20. A manufacturing process for the soil restoration structure, comprising the following steps:
   a) mixing porous mineral fragments with fiber, organic fertilizer, and organic plant protection liquid;
   b) mixing with at least more than one of the following mineral elements to produce the required synergistic effects: iron, nickel, manganese, copper, zinc, boron, molybdenum, sodium, magnesium, aluminium, silicon, phosphorus, sulphur, potassium, calcium, scandium, titanium, chromium, vanadium, gallium, selenium, germanium, lanthanum, samarium, cobalt, iodine, and tin;
   c) mixing with photosynthetic organisms from among the effective micro organisms and at least more than one lactic acid organism, yeast organism, actino-organism, and fermentative filamentous flora; and adding a hydrating excipient to cause the structures to form chunks or strips; and
   d) cutting the structures consisting of chunks or strips into small pieces or crumble to form granules.

* * * * *